June 6, 1961

M. CAMRAS 2,987,583

MAGNETIC TRANSDUCER HEAD

Filed Sept. 7, 1955

Inventor
MARVIN CAMRAS by Hill, Sherman, Meroni, Gross & Simpson Attys.

United States Patent Office
2,987,583
Patented June 6, 1961

2,987,583

MAGNETIC TRANSDUCER HEAD

Marvin Camras, Glencoe, Ill., assignor to Armour Research Foundation of Illinois Institute of Technology, Chicago, Ill., a corporation of Illinois Filed Sept. 7, 1955, Ser. No. 532,849
10 Claims. (Cl. 179—100.2)

This invention relates to an electromagnetic transducer head particularly adapted to magnetic recording apparatus.

In accordance with the teachings of the present invention, there is provided a magnetic core having a gap for coupling the core to a magnetic record medium, and the head including a coil disposed adjacent the gap in the core but not encircling the core as in conventional heads.

It has been found that such a construction has advantages for recording in that better biasing of tape layers not adjacent to the gap is achieved. Under these circumstances optimum bias is practicable since the same bias level may be optimum for long and for short wave lengths due to the proximity of the recording coil to the side of the tape opposite the core. Further, better resolution of high frequencies is obtained because eddy currents in the main core near the gap aid rather than oppose the high frequency component of the recording flux.

For playback, it has been found that the same head construction is advantageous and achieves better high frequency response because the coil picks up the very flux which in a conventional head is lost near the gap due to eddy current and hysteresis effects. Further, the present invention contemplates an air core coil which is not as susceptible to noises due to barkhausen, magnetostriction, and other effects occurring in the core. Even with an auxiliary piece of magnetic material linking the coil, the result is quieter since the tape does not ride on the auxiliary piece of magnetic material.

Additionally, the construction of this invention lends itself to novel and convenient mechanical arrangements, such as mounting the coil on the main body of the machine, with the scanning gap in a hinged flap or vice versa.

It is therefore an object of the present invention to provide a novel and improved electromagnetic transducer head.

It is a further object of the present invention to provide a head requiring only a very simple and small core which is relatively inexpensive and easily replaced.

It is a further object of the present invention to provide a head which for a similar coil and core, has a lower and more constant inductance than with conventional construction.

Other objects, features and advantages of the present invention will be more fully apparent from the following detailed description taken in conjunction with the accompanying drawings, in which.

Figure 2:
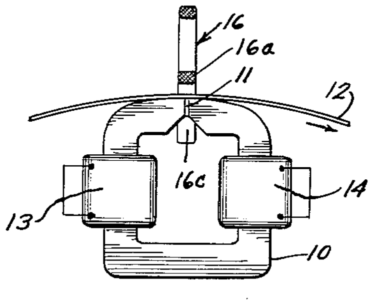
FIGURE 2 is a vertical sectional view taken generally along the line II—II of FIGURE 1.
Figure 2A:
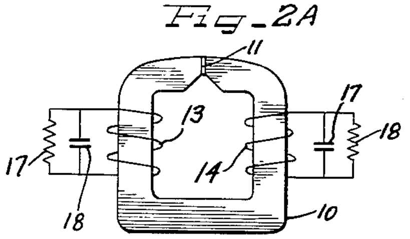
Figure 2B:
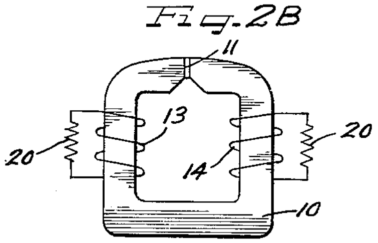
Figure 3:
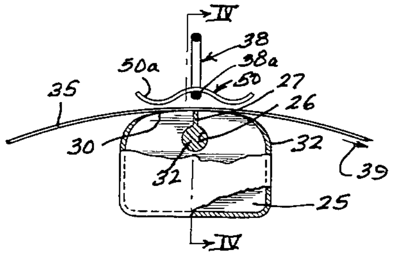
Figure 4:
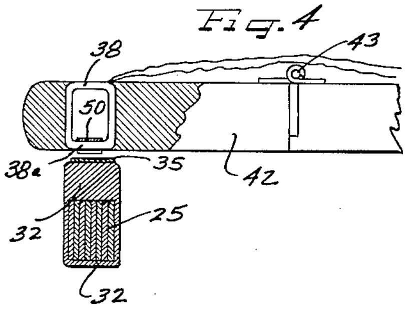
Figure 5:
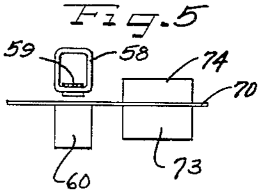
Figure 6:
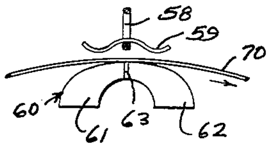

FIGURE 2*a* shows one form of equalizer circuit for the head of FIGURE 2;

FIGURE 2*b* shows a second form of equalizer circuit for the head of FIGURE 2;

FIGURE 3 is a diagrammatic elevational view of a modified form of electromagnetic transducer head according to the present invention;

FIGURE 4 is a vertical sectional view taken generally along the line IV—IV of FIGURE 3;

FIGURE 5 is a diagrammatic elevational view illustrating a head for use on a multiple track tape; and FIGURE 6 is a diagrammatic view of the structure of FIGURE 5 viewed at right angles and illustrating a novel core construction for the head of the present invention.

Figure 1:
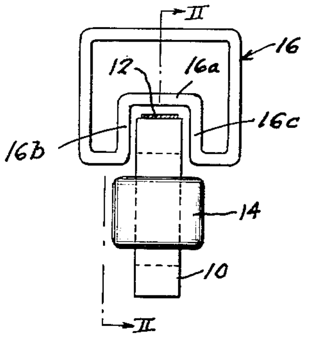
FIGURE 1 is a diagrammatic elevational view of a first embodiment of the present invention.

As shown in the drawings:

Referring to FIGURES 1 and 2, it will be observed that the head of the present invention may include a conventional ring type core 10 having a non-magnetic gap 11, for example comprising a copper gap spacer receiving a magnetic record medium 12 thereacross. The core may be provided with shorted loops or windings 13 and 14 surrounding legs of the core 10, as it has been found such "shading coils" tend to oppose signal flux from the record 12 linking the core. The shorted coils 13 and 14 act to force more flux through an outside coil 16 which is disposed near the gap 11 but which does not magnetically link the core 10. An equalizer circuit may be connected across the coil terminals of 13 and 14. For example, a resistor capacitor combination will emphasize the high frequency response since it effectively shorts out the windings only at high frequencies. Similarly an inductance-resistance combination may emphasize the lows. FIGURE 2*a* illustrates windings 13 and 14 shorted at high frequencies by networks including a resistance 17 and capacitance 18 in parallel. FIGURE 2*b* illustrates the case where a resistance 20 is in series with each coil to provide an inductance-resistance mode of equalization. As illustrated in FIGURE 1, the coil 16 may include a portion **16*a* extending in close proximity directly above the gap 11 with the conductors thereof extending parallel to the gap and transversely across the upper surface of the tape record medium 12. The winding may further include portions 16*b* and 16*c* extending along the sides of the gap 11 to pick up flux laterally of the gap. It will be apparent that the coil 16 may be mounted to be moved away from the gap 11 to accommodate threading of the tape 12** thereacross.

Referring to FIGURES 3 and 4, the head may comprise a flat laminated core structure 25 as illustrated or a solid core structure having an aperture 26 extending therethrough and having a very narrow slit 27 extending inwardly from the upper tape receiving edge 30 thereof to the aperture 26. In accordance with the present invention, the core 25 of magnetic material is completely imbedded in or coated with a high conductive material such as copper as indicated at 32 which also fills the aperture 26 and gap 27 as well as covering the opposite faces of the core 25 as illustrated in FIGURE 4. In this manner, the conductive coating 32 forms a loop path at substantially all points along the magnetic circuit provided by the core to oppose a signal flux linking the core. The tape receiving surface 30 of the core 25 is exposed to receive the tape 35, the conductive coating being removed at this surface where necessary. As in the previous embodiment, a winding 38 is provided which may be energized with suitable recording signal and bias currents to cause the head to act as a recording device, or may be connected with a suitable amplifier and other equipment to act as a pick-up device. The coil has its axis extending generally parallel to the direction of movement of the tape 35 indicated by arrow 39 and has its lower portion **38*a* disposed directly over the gap and in close proximity thereto and extending transversely of the tape 35. The winding may be carried by a suitable non-magnetic member 42 suitably hinged to a support carrying the core 25, a suitable hinge being indicated at 43. Thus the member together with the coil 38 may be pivoted away from the gap 27 to allow threading of the tape 35**, and then moved back into the position shown in FIGURES 3 and 4. It has been found that the proximity of the coil varies the volume but not the frequency response. Thus the variable position of the flap could be used instead of a volume control on inexpensive machines.

FIGURES 3 and 4 illustrate an auxiliary thin high permeability member 50 having end portions such as **50*a* disposed in proximity to the tape 35, the member 50 linking through the coil 38 so as to increase the flux from the record medium 35 linking the coil 38 when the head is used for playback of a recorded signal on the medium 35**. To avoid wavelength effects, the auxiliary member may be unsymmetrical on each side of the gap, curved, spaced from the record, etc.

Referring to FIGURES 5 and 6, the reference numeral 58 indicates a winding similar to that shown at 38 in FIGURE 3 and the reference numeral 59 indicates an auxiliary magnetic piece similar to the piece 50 illustrated in FIGURES 3 and 4. The reference numeral 60 indicates a suitable core for use with the outside coil 58, the core comprising a pair of pole pieces 61 and 62 defining a non-magnetic gap 63, and there being a large air gap between the free ends of the pole pieces 61 and 62 to increase the flux linking the coil 58. If the core is used with a multi-channel tape such as indicated at 70, the coil 58 may be of a width in the direction across the tape approximating one channel as illustrated in FIGURE 5, or may extend across the entire width of the multi-channel tape. In the latter case, the core piece 60 may be shifted to each channel in turn to cause the coil to pick up the respective channels, pick up from adjacent channels in such a case being relatively small due to absence of the concentrating effect of the gap 63 of the core 60. Also as indicated in FIGURE 5, a keeper such as 73 may be associated with the core 60 on each side thereof and movable therewith to isolate the adjacent channels. Cooperating keeper portion 74 may be pivotally mounted with the coil 58 and shiftable with the coil to cover unused channels on each side of the coil. Even without the keepers, pick up has been found for many purposes to be negligible for portions of the tape not touched by the core gap 63. Alternatively the cores and keepers, if any, may be fixed as shown, and the tape moved laterally for channel selection.

As previously noted, when the head of FIGURE 1 or 3 is used as a recording head, and the coil 16 or 38 energized with the high frequency bias and signal currents, the bias is improved since the upper layers of the tape 12 or 35 away from the gap 11 or 27 receive a relatively higher bias intensity for both long and short wavelengths. Alternatively, during recording the outside coil may be used for either the bias or the signal component alone, the other component being supplied by conventional means.

In FIGURE 6, where as previously stated winding 58 is similar to winding 38 of FIGURE 3, the large air gap between the free ends of the pole pieces 61 and 62 constitutes means providing effective reluctances for all flux paths between the pole pieces which are in shunting relation to said gap of the order of the reluctances of corresponding flux paths of the same length in air. In fact, of course, in the embodiment of FIGURE 6, all such shunt flux paths are in air entirely. The term "of the order of" is used in its usual sense with reference to powers of 10. In the claims, the term "magnetic recording flux" is used generically to cover high frequency bias flux or flux of signal frequency or both.

It will be apparent that many further modifications and variations may be effected without departing from the scope of the novel concepts of the present invention.

I claim as my invention:

1. A magnetic playback head comprising magnetic core means having a non-magnetic gap for receiving a magnetic record medium, and a pickup coil having its axis extending generally parallel to the path of the record medium, said coil being disposed on the side of said record medium opposite said gap, and an auxiliary magnetic piece linking said coil and extending in proximity to the record medium adjacent said gap but spaced from the path of said record medium across said core means.

2. A magnetic transducer apparatus comprising an active transducer means on one side of the path of a record medium and magnetically coupled to the record medium and operative to electrically reproduce a signal recorded on the record medium, a passive flux concentrating means at the opposite side of said path from said active transducer means, and means associated with said passive flux concentrating means tending to increase the reluctance of flux paths through said passive flux concentrating means not linking said active transducer means, said active means comprising a group of electrical conductors extending transversely of the path of the record medium and in close relation to the record medium in comparison to the axial extent of said group of conductors.

3. A magnetic transducer apparatus comprising an active transducer means on one side of the path of a record medium and magnetically coupled to the record medium, flux concentrating means at the opposite side of said path from said active transducer means comprising magnetic pole pieces defining a non-magnetic gap in magnetic coupling relationship to the record medium, and means associated with said flux concentrating means tending to increase the reluctance of flux paths through said flux concentrating means not linking said non-magnetic gap, said active means comprising a group of electrical conductors extending transversely of the path of the record medium and in close relation to the record medium in comparison to the axial extent of said group of conductors.

4. A magnetic transducer apparatus comprising an active transducer means in one position with respect to the path of a record medium, a passive flux concentrating means at a different position with respect to said path from said active transducer means and separate from said active means and having a flux concentrating region for coupling said active transducer means to said record medium, said active means comprising conductor means extending transversely to the path of said record medium and in close proximity thereto and a magnetic core strip extending longitudinally of said path and across said conductor means on the side thereof away from said path.

5. A magnetic playback head comprising magnetic core means having a non-magnetic gap for receiving one side of a magnetic record medium having a signal recorded thereon, a pickup coil for coupling with a magnetic signal field produced by said magnetic record medium and defined by said non-magnetic gap, said coil being disposed on the opposite site of said record medium from said core means, and an auxiliary magnetic piece linking said coil and extending in proximity to said opposite side of the record medium but spaced from the path of said record medium across said core means.

6. Magnetic reproducing apparatus comprising a magnetic record medium having an active magnetizable layer on one side thereof with a signal recorded thereon, flux concentrating means on said one side of said record medium and in close contact with said active layer of said record medium, and pickup means disposed on the other side of the record medium remote from said active layer and in coupling relation to the magnetic signal field from the record medium as concentrated at said pickup means by said flux concentrating means, said pickup means generating an electric signal in accordance with the signal field from the record medium coupled thereto.

7. A magnetic transducer apparatus comprising an active transducer means on one side of the path of a record medium for magnetic coupling to the record medium to electrically reproduce a signal recorded on the record medium, passive flux concentrating means at the opposite side of said path of the record medium from said active transducer means, and means associated with said passive flux concentrating means tending to increase the reluctance of flux paths through said passive flux concentrating means not linking said active transducer means, said active means comprising an electrical conductor extending transversely of the path of the record medium so as to be linked by signal flux from the record medium as concentrated by said passive flux concentrating means.

8. Magnetic reproducing apparatus comprising a magnetic record medium having an active magnetizable layer on one side thereof with a signal recorded thereon, flux concentrating means on said one side of said record medium and in close contact with said active layer of said record medium, pickup means disposed on the other side of the record medium remote from said active layer and in coupling relation to the magnetic signal field from the record medium as concentrated at said pickup means by said flux concentrating means, said pickup means generating an electric signal in accordance with the signal field from the record medium coupled thereto, and means associated with said flux concentrating means tending to increase the reluctance of flux paths through said flux concentrating means not linking said pickup means.

9. Magnetic reproducing apparatus comprising a magnetic record medium having an active magnetizable layer on one side thereof with a signal recorded thereon, flux concentrating means on said one side of said record medium and in close contact with said active layer of said record medium, and pickup means disposed on the other side of the record medium remote from said active layer and in coupling relation to the magnetic signal field from the record medium as concentrated at said pickup means by said flux concentrating means, said pickup means generating an electric signal in accordance with the signal field from the record medium coupled thereto, said flux concentrating means comprising a pair of pole pieces having adjacent ends defining a non-magnetic gap and being in close contact with said active layer of said record medium adjacent said gap and said pole pieces having remote free ends disposed in relatively greatly spaced open circuit relation.

10. In a magnetic recording head, magnetic flux concentrating means comprising a pair of pole portions of magnetic material defining a non-magnetic gap for concentrating magnetic flux at the active surface of a magnetic record medium travelling successively across said pole portions along a record medium path, magnetic recording flux producing means offset from said pole portions in the direction from said pole portions toward said record medium path and coupled to said pole portions for producing a recording magnetomotive force therebetween, said magnetic flux concentrating means having magnetic flux paths for magnetic recording flux produced by said magnetic recording flux producing means which paths are on the same side of said record medium path as said concentrating means and in shunting relation to said gap, and said magnetic flux concentrating means having means providing effective reluctances for all of said magnetic flux paths which substantially contribute to the total reluctance shunting said gap on the same side of said path of the order of the reluctances of corresponding flux paths of the same length in air.

References Cited in the file of this patent

UNITED STATES PATENTS

| | | |
|---|---|---|
| 2,484,568 | Howell | Oct. 11, 1949 |
| 2,675,429 | Rohling | Apr. 13, 1954 |
| 2,697,135 | Gratian | Dec. 14, 1954 |
| 2,725,430 | Gratian et al. | Nov. 29, 1955 |
| 2,777,698 | Kurzeder | Jan. 15, 1957 |
| 2,850,581 | Gratian | Sept. 2, 1958 |

FOREIGN PATENTS

| | | |
|---|---|---|
| 429,987 | Great Britain | June 11, 1935 |